United States Patent [19]
Van Mill

[11] Patent Number: 4,923,358
[45] Date of Patent: May 8, 1990

[54] PORTABLE CART WITH ANGULAR DISCHARGE AUGER

[75] Inventor: Michael D. Van Mill, Shell Rock, Iowa

[73] Assignee: Unverferth Manufacturing Co., Inc., Kalida, Ohio

[21] Appl. No.: 315,643

[22] Filed: Feb. 27, 1989

Related U.S. Application Data

[63] Continuation of Ser. No. 85,886, Aug. 13, 1987, abandoned.

[51] Int. Cl.⁵ ............................................. B60P 1/40
[52] U.S. Cl. .................................... 414/519; 198/532; 198/550.1; 198/668; 198/671; 414/520; 414/523; 414/526
[58] Field of Search ............... 414/505, 523, 526, 326, 414/519, 520; 198/370, 532, 668, 670, 671, 550.6, 550.1, 860.4

[56] References Cited

U.S. PATENT DOCUMENTS

| | | | |
|---|---|---|---|
| 2,100,937 | 11/1937 | Bowe | 198/532 X |
| 2,296,014 | 9/1942 | Benzel, Sr. et al. | 414/526 X |
| 3,283,925 | 11/1966 | Gutekunst | 198/532 X |
| 3,391,778 | 7/1968 | Lasiter | 198/671 X |
| 3,874,530 | 4/1975 | Purdy | 414/526 |
| 4,095,705 | 6/1978 | Hood | 414/526 X |
| 4,218,169 | 8/1980 | Arends | 414/523 |
| 4,415,303 | 11/1983 | Westendorf et al. | 414/523 X |
| 4,427,105 | 1/1984 | Hawley et al. | 414/523 X |
| 4,529,085 | 7/1985 | Johnson | 198/532 |

Primary Examiner—David A. Bucci
Attorney, Agent, or Firm—Henderson & Sturm

[57] ABSTRACT

A portable, self-unloading cart (12) for handling granular material is disclosed, which cart (12) has a fixed, single auger tube (63) with a recessed end (68) connected to a hopper (22) for drawing material from below the hopper sump (23), and with a modified frame (24) providing for the remainder of the auger tube (63) extending both forwardly and sidewardly of the hopper (22) in an angular relation with the hopper (22), and with the auger tube (63) having pivoted sections enabling an upper section (69) in use to be extended rearwardly alongside the hopper (22) during transport, the discharge end (73) remaining disposed within the confines of the hopper and frame length.

6 Claims, 4 Drawing Sheets

PORTABLE CART WITH ANGULAR DISCHARGE AUGER

This is a continuation of co-pending application Ser. No. 07/085,886 filed on Aug. 13, 1987, now abandoned.

TECHNICAL FIELD

The present invention relates generally to a portable, self-unloading cart for granular materials and the like, and more particularly to an improved portable cart providing an angular discharge auger recessed into the hopper of the cart and below the sump thereof.

BACKGROUND ART

Portable carts for discharging granular material and the like are not new as seen from U.S. Pats. to Niewold No. 3,265,253; Meharry No. 3,498,483; Obermeyer et al No. 3,575,306 and Arends No. 4,218,169.

Although these patents show efforts to provide grain carts with hoppers having a single auger for self-unloading the hopper, and although these efforts include pivoting or rotating auger tubes of various arrangements capable of assuming many positions relative to the cart frame and hopper, none of the structures shown in these patents, nor others known in the field, provide the full attendant advantages of the instant portable cart.

The art known today does not provide a portable, self-unloading cart for granular material and the like which utilizes a recessed auger completely under the floor line to draw from below the hopper floor line, thereby eliminating the need of a discharge shoot; a non-pivoting, non-rotating auger tube angularly related to the cart frame to enable the prime mover operator to see the discharge end of the auger tube without inconvenient and uncomfortable stretching and craning of the head and shoulders, nor a portable cart having those structural features which provides a foldable transport position for the tube so as not to elongate the cart frame length to facilitate normal transport.

DISCLOSURE OF THE INVENTION

The invention relates to an improved portable cart having in combination a hopper for holding granular material, which hopper includes a sump substantially centrally thereof and at the bottom thereof through which the granular material or the like can flow by gravity; a frame having a front, opposed sides and a rear for supporting the hopper; a pair of wheels supporting the frame; and an auger unit for receiving the granular material from the sump and for discharging the granular material externally of the hopper, the auger unit including an elongated tube and an auger rotatably mounted therein, the tube having a lower end which is connected to and recessed into the hopper and extended below and open to the sump for receiving material therefrom, and an upper end which is extended forwardly and sidewardly away from the hopper so as to be angularly related therewith.

It is an object of this invention to provide an improved portable cart for self-unloading granular material and the like.

Another object of this invention is to provide an improved portable cart for self-unloading granular material and the like wherein the material discharge tube has a fixed relationship with the hopper and extends forwardly and sidewardly relative to the hopper so as to be easily viewable by the operator of the prime mover of the cart.

Another object of this invention is to provide a fixed angular related discharge tube relative to the hopper, the lower end of which is connected to and open to the sump of the hopper, and which lower end extends upwardly from the sump at an approximate 29°, with the auger tube having an upper end extended further upwardly from a connection with the lower end thereof at an approximate additional 17°.

Still another object of this invention is to provide a portable cart having a fixed auger discharge tube with a lower end recessed to draw from below the hopper sump line, with the auger extending forwardly and sidewardly relative to the hopper such that the discharge end of the auger tube is disposed forwardly of the front of the hopper and easily viewable by the operator of a prime mover for the portable cart.

Yet another object of this invention is to provide a portable cart fulfilling the aforementioned objectives, and wherein the upper end of the auger tube has a pivotal connection such that an upper section thereof can be placed in a rearwardly, horizontally extended position along side the hopper and with the discharge end of the tube inwardly of the hopper rear such as to provide for efficient transportation of the portable cart.

BRIEF DESCRIPTION OF THE DRAWINGS

These and other attributes of the invention will become more clear upon a thorough study of the following description of the best mode for carrying out the invention, particularly when reviewed in conjunction with the drawings, wherein.

BEST MODES FOR CARRYING OUT THE INVENTION

Figures 1, 2:
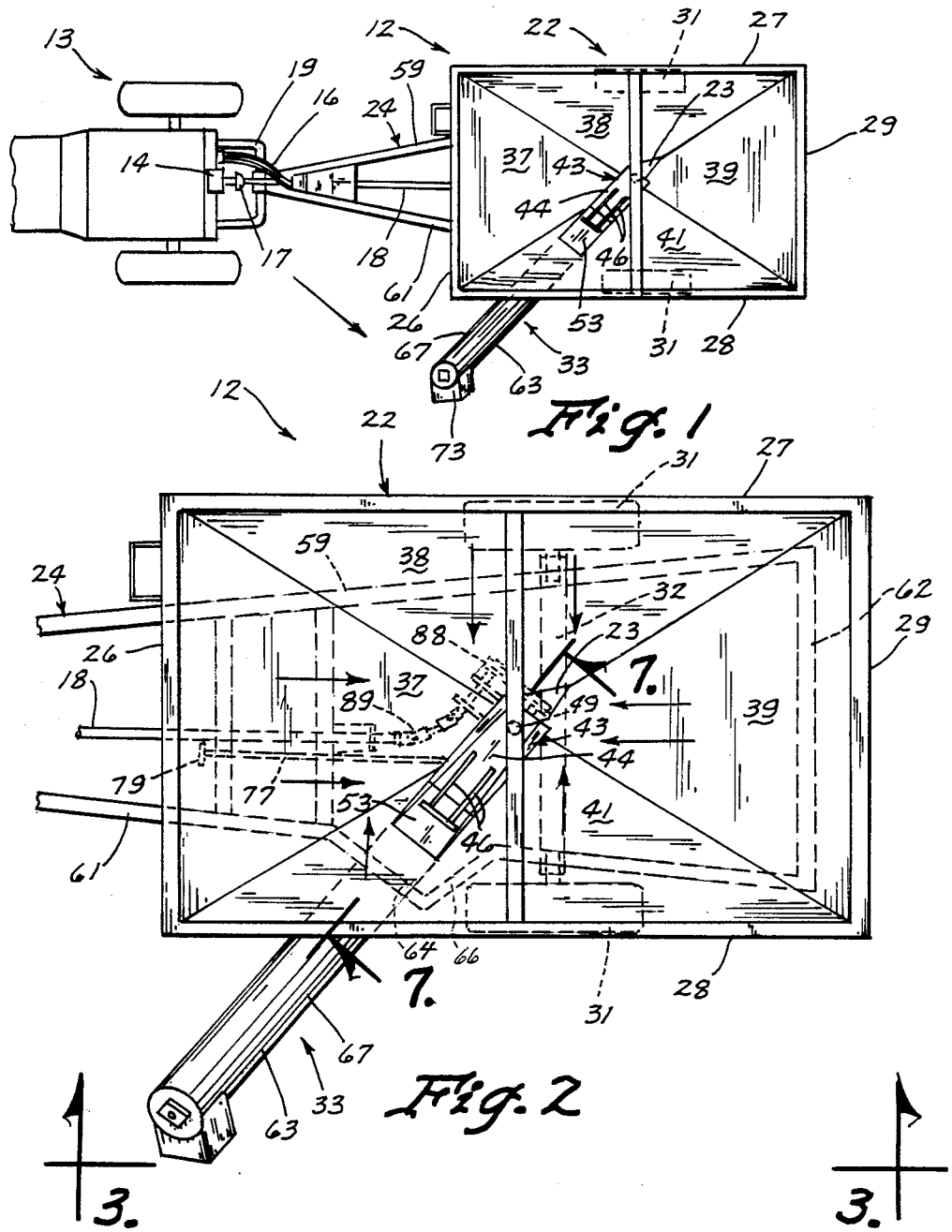
FIG. 1 is a reduced plan view of the portable cart of this invention shown in connected relationship with a conventional farm tractor, partially shown.
FIG. 2 is an enlarged top plan view of the portable cart of FIG. 1, with certain parts thereof shown by the use of dotted lines for clarity of the invention.

Referring now more particularly to the drawings, there is illustrated a portable, self-loading cart (12) for transporting granular material such as grain, or the like. The cart is normally pulled by a prime mover such as a conventional farm tractor (13) having a seat (14) at the rear for the operator, hydraulic lines (16) connected between the tractor (13) and the cart (12) for supplying hydraulic power to the cart (12), a power-take off (17) for supplying drive to the cart power shaft (18), and a hitch bar (19) for pivotal connection with the cart hitch at (21).

Generally the portable cart (12) comprises in combination a hopper (22) for holding the material and having a sump (23)(FIG. 7) at its lowest point substantially centrally of the hopper through which, when open, the material can flow by gravity; a frame (24) having a front end (26)(FIGS. 2 and 3), opposed sides (27),(28), and a rear end (29) for supporting the hopper (22); a pair of wheels (31) and an axle member (32)(FIG. 2) for supporting the frame (24), each wheel (31) mounted laterally adjacent a side (27) or (28); and an auger unit (33) for receiving the material from the hopper sump (23) and for discharging the material externally at the hopper (22), for example into another cart, truck or the like for transportation or storage.

Figure 3:
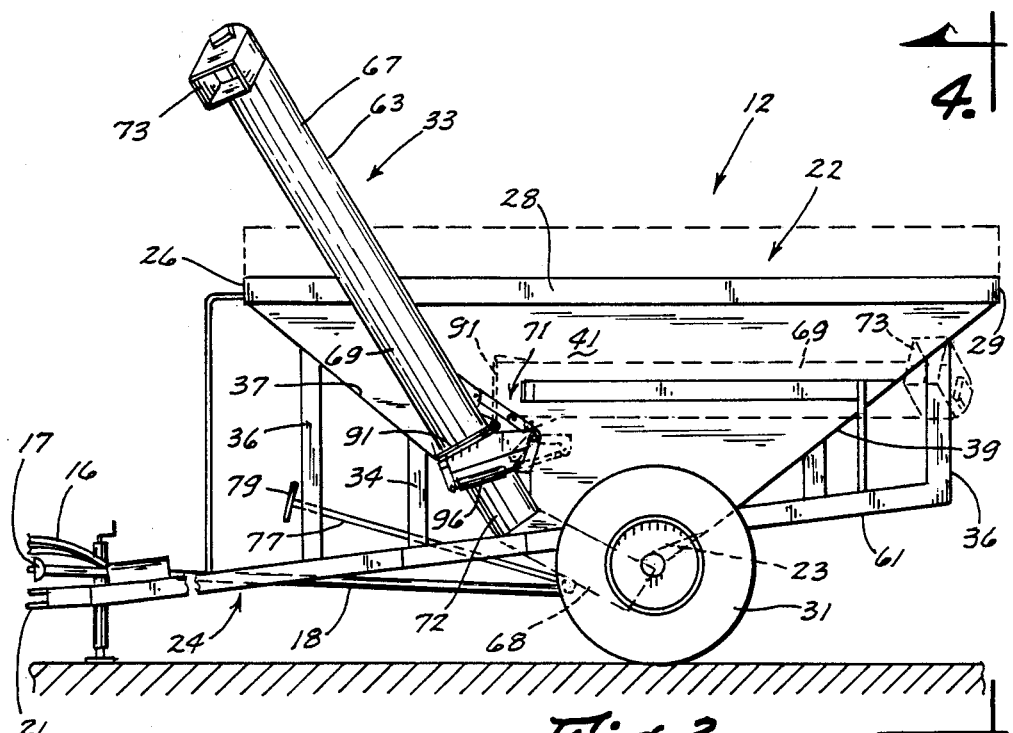
FIG. 3 is a side elevational view of the cart of FIG. 2.
Figure 4:
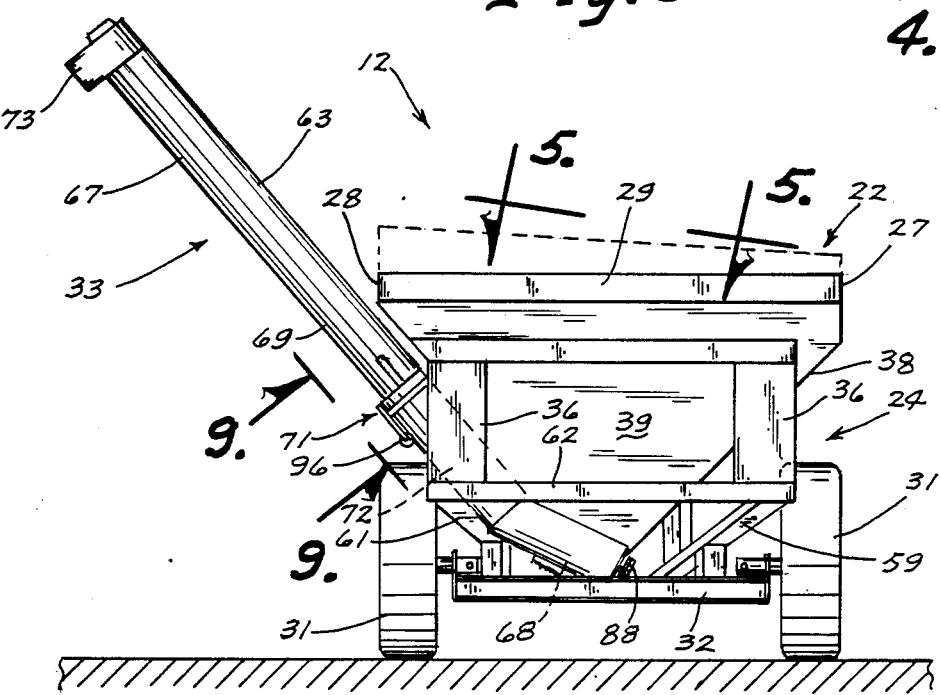
FIG. 4 is a rear elevational view as taken along the line 4—4 in FIG. 3.
Figure 5:
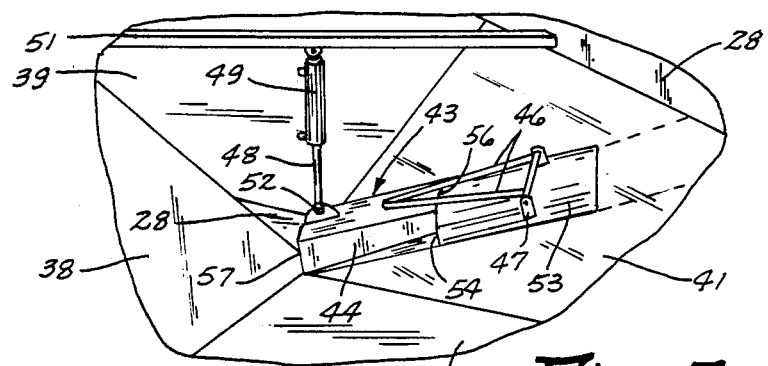
FIG. 5 is a reduced detailed view of the gate valve arrangement in the sump of the portable cart hopper as viewed along line 5—5 in FIG. 4.
Figure 6:
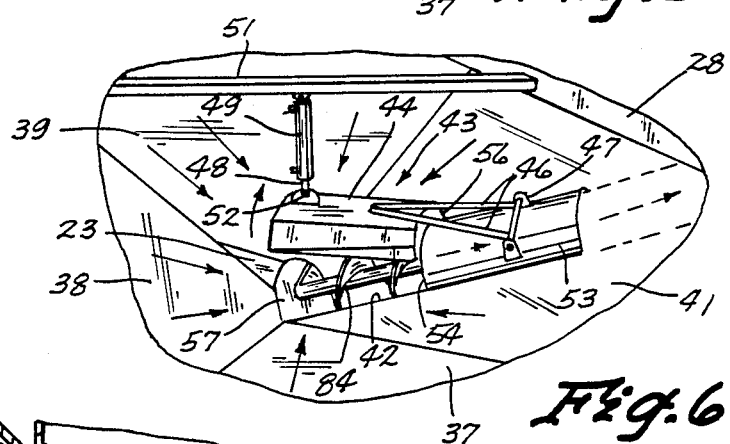
FIG. 6 is a slightly enlarged and more detailed view of the gate valve of FIG. 5, showing it in a raised, open condition.

More particularly, the hopper (22) is supported on the frame (24) by longitudinally spaced, vertical uprights (34), with front and rear supports (36)(See FIG. 4). The hopper (22) itself is rectangular in plan, with interior walls (37),(38),(39) and (41) which converge downwardly from the front, sides and rear (26–29) to the sump (23), and a discharge opening (42)(FIG. 6) formed in one (41)(FIG. 2) of the walls. Obviously, other hopper wall or floor arrangements are feasible, as long as the granular material falls toward the opening (42) and the sump (23). As shown by dotted lines in FIGS. 3 and 4, the walls (37),(38),(39) and (41) may be vertically extended by special end and side pieces, if desirable.

Fixed to the hopper discharge opening (42) is a hopper gate assembly (43) which comprises a circularly curved gate (44), gate pivot arms (46) pivoted to the wall (41) at ears (47)(FIG. 7) and secured as by welding to the gate (44), and a lift rod (48) which is part of a hydraulic piston and cylinder unit (49) suspended from a brace (51) extended between the sides (27),(28) and over the hopper sump (23). The lift rod (48) is pivotally connected to the gate (44) at (52) at a lower end thereof such that raising movement of the rod (48) results in the gate (44) being raised above so as to open the discharge opening (42), the gate (44) pivoting over the wall (41) and opening (42) at the pivot ears (47). The hopper wall (41) is also provided with a slightly raised, curved portion (53) such that its lower end (54) will mate with the upper gate end (56), and the bottom converging area of the walls (37–39) is provided with a panel (57) with which the lower end (58) of the gate (44) mates when lowered, this arrangement providing for a tight seal of the gate (44) when closed to prevent discharge of granular material from the hopper (22).

As best shown in FIGS. 2, 3 and 4, the frame (24) comprises a pair of elongated side members (59),(61) converging at their front ends (FIG. 1) for the hitch (21), and diverging toward their rear ends such that they are joined by a rear member (62) for supporting the hopper (22) by means of the uprights (34) and supports (36), and supported slightly rearwardly of the sump (23) by the wheels and axle unit (31),(32).

To aid in providing for the angular placement of the auger tube, indicated generally at (63) in FIG. 2, one side member (61) is bent outwardly at portion (64) and then inwardly at the portion (66) in a V-shape forwardly of a wheel (31), the tube (63) extended over and above the portions (64),(66).

The auger unit (33) includes the elongated auger tube (63) comprised of an upper portion (67) and a lower portion (68), the upper portion (67) extended forwardly and sidewardly (FIGS. 2 and 3) away from the hopper (22) so as to have an angular relationship with the longitudinal and transverse axes of the hopper (22). It will be noted that the lower portion (68) is connected to the hopper wall curved portion (53) so as to be fixed therewith and thus is recessed into the hopper (22).

Figure 7:
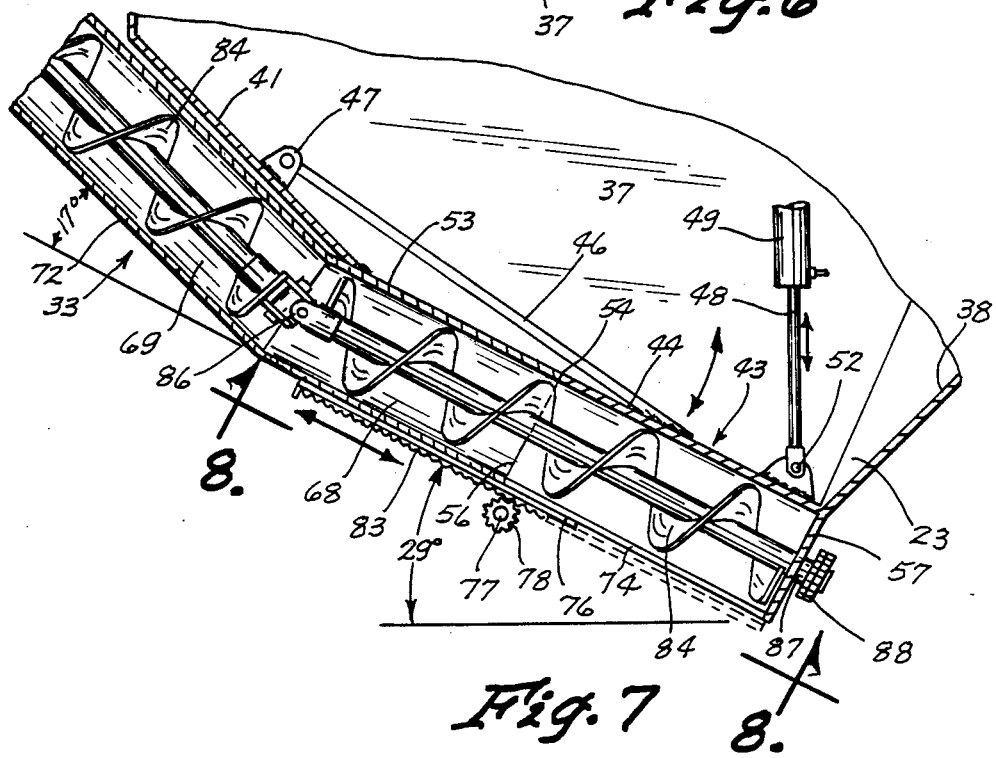
FIG. 7 is an enlarged sectional view of the lower portion of the auger tube, and showing the gate valve as taken along the line 7—7 in FIG. 2.
Figure 8:
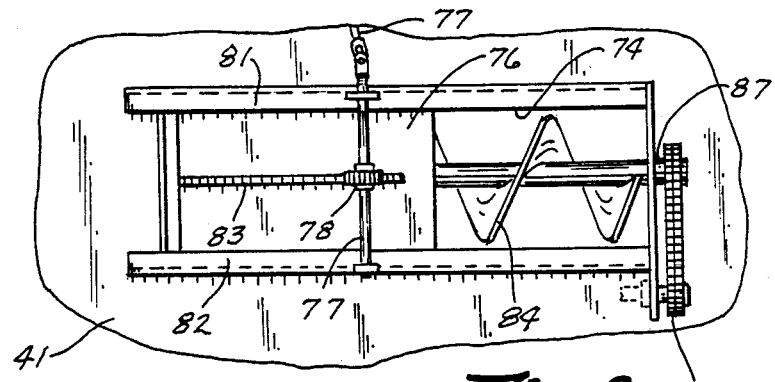
FIG. 8 is a view of the hopper bottom discharge opening as taken along the line 8—8 in FIG. 7.

The upper tube portion (67) comprises an upper section (69) pivotally connected by a conventional bell-crank unit (71)(FIGS. 9 and 10) to a lower section (72), and with a discharge spout (73) at the outer end of the upper section (69). Referring to FIGS. 7 and 8, the lower tube portion (68) has a discharge opening (74) formed at its lower end, and is provided with a slide gate (76) for opening and closing the opening (74); an elongated rod (77) having a pinion (78) on its inner end and operated manually by a handle (79)(FIG. 3) near the front of the hopper frame (24) rotatable to slide the gate on guides (81),(82) by means of a rack (83) affixed to the gate (76).

Further, to achieve the angular relationship of the tube (63) with the hopper (22), the lower portion (68) extends upwardly from the sump (23) at approximately 29° (FIG. 7) and the upper portion (69) extends upwardly from the lower portion another approximate 17°. This provides for the fixed, single auger (63) drawing from the hopper (22) below the sump (23) and having its discharge spout (73) to one side of the hopper (22) and forwardly of the hopper front end (26) such that the tractor operator on the seat (14) can easily turn his/her head with sufficient ease to see the discharge spout (73) when discharging.

Delivery of the material is effected by an auger (84) rotatably mounted in the tube (63); a universal joint (86)(FIG. 7) being provided at the junction of the upper and lower tube portions (67),(68), and the lower end inserted through a bearing (87) on the panel (57) for driving engagement via a sprocket and chain unit (88), and a double universal joint (89)(FIG. 2) with the power shaft (17).

Figure 9:
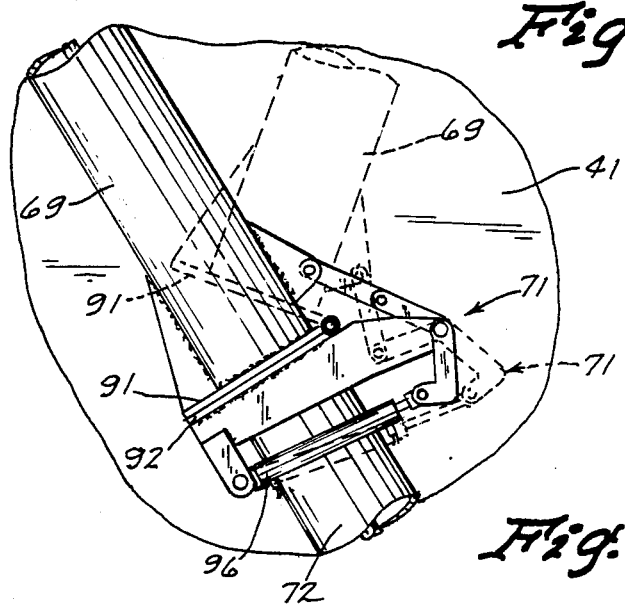
FIG. 9 is a detailed view of the connection between auger sections as taken along the line 9—9 in FIG. 4.
Figure 10:
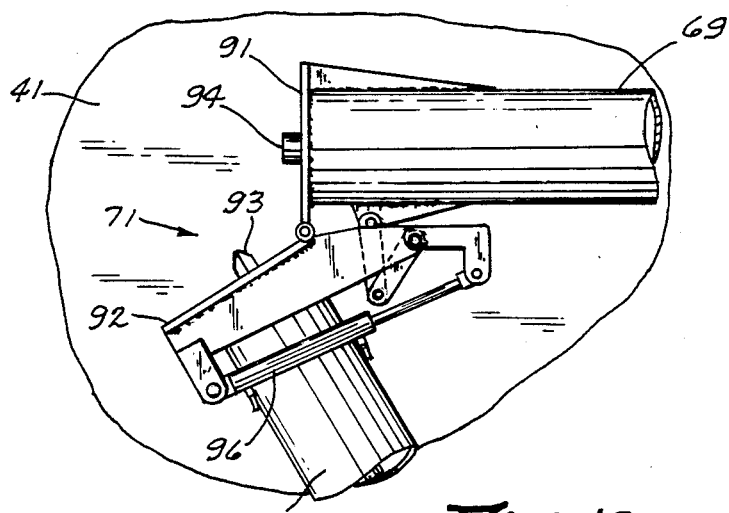
FIG. 10 is a view similar to FIG. 9, showing the tube sections in a pivoted, open condition.

Referring to FIGS. 9 and 10, the pivotal connection at (90) of the upper tube section (69) and the lower tube section (72) is best illustrated, the upper section having a collar (91) which mates with a lower section collar (92), the respective male and female auger ends (93),(94) also provided for transmitting drive for the auger (84). The conventional bell-crank unit (71), operated by a hydraulic piston and cylinder (96) locks the upper tube section (69) in longitudinal alignment with the lower tube section (72), and is operable to unfold the upper section (69) to a position best shown by dotted lines in FIG. 3 where the upper section extends horizontally alongside the hopper (22) and frame (24). A support (97) is provided for retaining the tube section (72) in its transport position. It will be noted the discharge spout (73) is disposed forwardly of the hopper rear end (29), thereby obviating the need for special transport arrangements for highway travel.

I claim:

1. A portable cart comprising:
   hopper means including a hopper for holding granular material, said hopper having a sloping floor formed therein and a sump substantially centrally of said floor into which the granular material can flow by gravity;

a frame having a front, opposed sides and a rear for supporting said hopper means;

at least a pair of wheels supporting said frame, each wheel mounted adjacent a side thereof;

auger means for receiving the granular material from said sump and for discharging the granular material externally of said hopper means, said auger means including an elongated tubular housing and an auger rotatably mounted therein, said tubular housing having a lower end merged with said floor and connected to said floor so as to close off said sump from grain held by said floor, said tubular housing having also an upper end pivotally connected to said lower end and extended forwardly and sidewardly relative to said wheels and away from said hopper so as to have an angular relationship with the longitudinal and transverse axis of said hopper; wherein the angular orientation of the lower end of the tubular housing and the length of the upper end of the tubular housing are chosen such that when the tubular housing is employed in the discharge configuration, the discharge end of the tubular housing will extend to the side and forward of a front end of the hopper;

means mounted within said hopper operable to move said tubular housing lower end away from said sump to permit grain to flow therein; and said auger means including a screw auger extended from said sump to the tubular housing upper end for granular material unloading purposes.

2. A portable cart comprising in construction:

hopper means including a hopper for holding granular material, said hopper having a sump substantially centrally thereof through which the granular material can flow by gravity; wherein said hopper sump includes a movable gate pivotally connected to a lift rod forming a portion of a hydraulic piston and cylinder which is suspended from a brace which spans the hopper sump;

a frame having a front, opposed sides and a rear for supporting said hopper means;

at least a pair of wheels supporting said frame, each wheel mounted adjacent a side thereof;

auger means for receiving the granular material from said sump and for discharging the granular material externally of said hopper means, said auger means including an elongated tube and an auger rotatably mounted therein, said tube having a lower end supported below said sump for receiving material therefrom and an upper end pivotally connected to said lower end and extended forwardly and sidewardly relative to said wheels and away from said hopper so as to have an angular relationship with the longitudinal and transverse axes of said hopper; and further wherein said auger tube lower end is connected to and recessed into said hopper and extended below and being open to said sump.

3. A portable cart comprising in construction:

hopper means including a hopper for holding granular material, said hopper having a sump substantially centrally thereof through which the granular material can flow by gravity;

a frame having a front, opposed sides and a rear for supporting said hopper means;

at least a pair of wheels supporting said frame, each wheel mounted adjacent a side thereof;

auger means for receiving the granular material from said sump and for discharging the granular material externally of said hopper means, said auger means including an elongated tube and an auger rotatably mounted therein, said tube having a lower end supported below said sump for receiving material therefrom and an upper end pivotally connected to said lower end and extended forwardly and sidewardly relative to said wheels and away from said hopper so as to have an angular relationship with the longitudinal and transverse axes of said hopper, wherein said auger tube lower end is connected to and recessed into said hopper and extended below and being open to said sump and wherein said hopper sump includes a gate forming an extension of said auger means lower end; and hydraulic means connected to said gate to move said gate from a first position closing off said sump to material from said hopper means to a second position opening said sump to the flow of material from said hopper means to said sump.

4. A portable cart comprising in construction:

hopper means including a hopper for holding granular material, said hopper having a sump substantially centrally thereof through which the granular material can flow by gravity;

a frame having a front, opposed sides and a rear for supporting said hopper means;

at least a pair of wheels supporting said frame, each wheel mounted adjacent a side thereof;

auger means for receiving the granular material from said sump and for discharging the granular material externally of said hopper means, said auger means including an elongated tube and an auger rotatably mounted therein, said tube having a lower end supported below said sump for receiving material therefrom and an upper end pivotally connected to said lower end and extended forwardly and sidewardly relative to said wheels and away from said hopper so as to have an angular relationship with the longitudinal and transverse axes of said hopper wherein said auger tube lower end is connected to and recessed into said hopper and extended below and being open to said sump and wherein said auger means lower end includes a gate having a concave formation operable to form a mating relation with a like concave formation of said auger means lower end; and hydraulic means connected to said gate to move said gate from a first position closing off said sump to material from said hopper means to a second position opening said sump to the flow of material from said hopper means to said sump.

5. A portable cart comprising in construction:

hopper means including a hopper for holding granular material, said hopper having a sump substantially centrally thereof through which the granular material can flow by gravity;

a frame having a front, opposed sides and a rear for supporting said hopper means;

at least a pair of wheels supporting said frame, each wheel mounted adjacent a side thereof; and auger means for receiving the granular material for said sump and for discharging the granular materially externally of said hopper means, said auger means including an elongated tube and an auger rotatably mounted therein, said tube having a lower end supported below said sump for receiving material therefrom and an upper end extended forwardly and sidewardly away from said hopper so as to have an angular relationship with the longitudinal and transverse axes of said hopper wherein said auger tube lower end is connected to and recessed into said hopper and extended below and being open to said sump; and, 'wherein said frame is bent outwardly and then inwardly in a V-shaped forward of one of said wheels below said auger tube lower end; and said auger tube is fixed at said connection with said hopper.

6. A portable cart comprising in construction:

hopper means including a hopper for holding granular material, said hopper having a sump substantially centrally thereof through which the granular material can flow by gravity;

a frame having a front, opposed sides and a rear for supporting said hopper means;

at least a pair of wheels supporting said frame, each wheel mounted adjacent a side thereof;

auger means for receiving the granular material from said sump and for discharging the granular material externally of said hopper means, said auger means including an elongated tube and an auger rotatably mounted therein, said tube having a lower end supported below said sump for receiving material therefrom and an upper end pivotally connected to said lower end and extended forwardly and sidewardly relative to said wheels and away from said hopper so as to have an angular relationship with the longitudinal and transverse axes of said hopper wherein said auger tube lower end is connected to and recessed into said hopper and extended below and being open to said sump; the lower end of said tube comprises a first section operatively connected to the hopper and disposed at a first angular disposition and second section operatively connected to the hopper and the first section; wherein, said second section is angularly disposed relative to first section; and wherein the second section is aligned with the upper end of the tube when the tube is disposed in the discharge configuration; the portion of the auger that is mounted in the lower end of the tube comprises a first auger section aligned with the first section of the tube and a second auger section aligned with the second section of the tube wherein the first and second auger sections are operatively connected to one another by a universal coupling; and, wherein the second section of the auger is operatively connected to the portion of the auger which is mounted in the upper end of the tube by a disconnectable coupling that disengages the second section of auger from the portion of the auger which is mounted in the upper end of the tube when the upper end of the tube is pivoted away from the said lower end;

said tube is angularly related to the hopper wherein the lower end of the tube is fixedly secured to the hopper and extends forwardly and sidewardly relative to the wheels and the hopper;

the angular orientation of the lower end of the tube and the length of the upper end of the tube are chosen such that when the tube is deployed in the discharge configuration the discharge end of the tube will extend to the side and forward of a front end of the hopper; and the angular orientation of the lower end of the tube and the length of the upper end of the tube are chosen such that when the tube is deployed in the storage configuration the upper end of the tube will be disposed substantially below, beneath and generally parallel to a top of one side of the hopper; and, wherein the discharge end of the tube will not extend beyond a rear end of the hopper.

* * * * *